(No Model.) 9 Sheets—Sheet 3.

G. WESTINGHOUSE, Jr.
ELECTRIC AND FLUID LOCOMOTOR.

No. 550,467. Patented Nov. 26, 1895.

Fig. 4.

WITNESSES:

INVENTOR

BY

ATTORNEY.

(No Model.) 9 Sheets—Sheet 6.

G. WESTINGHOUSE, Jr.
ELECTRIC AND FLUID LOCOMOTOR.

No. 550,467. Patented Nov. 26, 1895.

Fig. 7.

WITNESSES:

INVENTOR
George Westinghouse Jr.
BY
Charles A. Terry.
ATTORNEY.

(No Model.) G. WESTINGHOUSE, Jr. 9 Sheets—Sheet 7.
ELECTRIC AND FLUID LOCOMOTOR.

No. 550,467. Patented Nov. 26, 1895.

(No Model.) 9 Sheets—Sheet 8.

G. WESTINGHOUSE, Jr.
ELECTRIC AND FLUID LOCOMOTOR.

No. 550,467. Patented Nov. 26, 1895.

(No Model.) 9 Sheets—Sheet 9.

G. WESTINGHOUSE, Jr.
ELECTRIC AND FLUID LOCOMOTOR.

No. 550,467. Patented Nov. 26, 1895.

Fig.10.

UNITED STATES PATENT OFFICE.

GEORGE WESTINGHOUSE, JR., OF PITTSBURG, PENNSYLVANIA.

ELECTRIC AND FLUID LOCOMOTOR.

SPECIFICATION forming part of Letters Patent No. 550,467, dated November 26, 1895.

Application filed February 5, 1892. Serial No. 420,479. (No model.)

*To all whom it may concern:*

Be it known that I, GEORGE WESTINGHOUSE, Jr., a citizen of the United States, residing in Pittsburg, in the county of Allegheny and State of Pennsylvania, have invented a certain new and useful Improvement in Electric and Fluid Locomotors, (Case No. 436,) of which the following is a specification.

The invention relates to the construction of apparatus for converting and utilizing energy, and particularly for operating vehicles—such, for instance, as street-cars—and it involves certain improvements in the construction of rotary pumping and motor apparatus and to the operation of the same by means of electric motors.

The invention involves the combination of an electric motor or other suitable motor, a pumping apparatus driven thereby, and a rotary motor device driven by the operation of the pumping apparatus. The power exerted by the rotary motor apparatus is then expended in driving the car or any other desired machinery.

In another application filed by me July 16, 1890, Serial No. 358,971, I have described and claimed certain improvements in rotary motor or pumping apparatus of a character especially useful in connection with electric motors for driving cars. The said motor or pumping apparatus belongs to that class of rotary engines in which the drum is revolved within a case the bore of which is eccentric to the axis of the drum and is of such diameter that when the drum is in close proximity to one side of the core of the case a considerable space will intervene between the drum and the bore upon the opposite side. The drum is provided with pistons or abutments, as in the case of a rotary engine or motor, and these are hinged to or moved radially with reference to the drum, so as to move in contact with the surface of the bore. The drum may form a part of the shaft, which may extend through one or both heads of the case, as required in different instances. When it is desired to use an apparatus of this character as a pump, the shaft of the drum is driven by external power—as, for instance, by an electric motor. If the electric motor drives it at a constant speed, then the pump with its cylinder in one position will deliver a constant quantity of fluid. In order to effect a variation in this quantity without changing the speed of the electric motor, it is necessary to adjust the relative positions of the cylinder and drum, so that they may be more or less eccentric to each other. This adjustability of the bore of the cylinder with reference to the drum forms one of the principal features of the invention described in the application above referred to.

When it is desired to use the apparatus as a motor or engine, fluid is admitted through the case to the drum upon one side. By exerting pressure upon the abutments or pistons the drum is thus caused to revolve. After performing its work the fluid escapes through suitable ports in the opposite side of the cylinder. In order to vary the power and speed of the apparatus when thus used as a motor, without changing the pressure under which the fluid is supplied to it, the position of the cylinder with reference to the drum may be varied, as in the case of the pump, thus exposing a greater or less effective amount of piston-surface to the action of the fluid, with a corresponding modification in the quantity consumed for each revolution.

In my present invention I combine an adjustable fluid motor or engine of this character with an adjustable rotary pumping apparatus of the character referred to, and drive the drum of this pumping apparatus by means of an electric or other motor, which may be operated at a constant speed. Various different ways of adjusting the relative positions of the cylinder and drum of both the pump and the motor or engine may be adopted, as found convenient.

The invention also involves certain details in the construction of the various parts of the apparatus, and these will be particularly described in connection with the drawings.

In carrying out the invention I may employ a truck having six wheels. A main truck carries four of the wheels, and the other two belong to a supplemental or pony truck, which is pivoted to the main truck or to some suitable portion of the car-body. The car-body is arranged with reference to the truck so that the middle pair of wheels is beneath the central portion of the car, and they receive the greater share of the weight of the car-body. The propelling power is applied to the axle of these central wheels. This construction permits the car to pass around curves with a minimum amount of friction. The driving-wheels may, if desired, be coupled in any desired manner with the other wheels of the truck for the purpose of increasing the traction.

In the accompanying drawings.

Referring to the figures, A represents the frame of the truck, and $B'$ $B'$ and $B^2$ $B^2$ the main-truck wheels.

$b'$ $b'$ represent the wheels of the pony-truck, carried by the frame C, pivoted or coupled to the frame A or to the car-body in any suitable manner, as indicated at $a$, for instance. The wheels are, preferably, so located that the main-truck wheels come beneath the central portion of the car.

Power is communicated to the axle B of the wheels $B'$ from an electric motor D by means of a rotary pump E, driven by the electric motor, and a rotary engine or motor F, which is operated by the fluid delivered by the pump.

The electric motor D is constructed as follows: The field-magnet cores of the motor are represented at $d'$ $d'$ and the armature at $d$. The field-magnet is provided with magnetizing-coils $d^2$, which are wound and connected in any suitable well-known manner. The cores $d'$ are united with a back piece or plate $d^3$, which may serve also as a head for the case of the rotary pumping apparatus E. The free ends of the poles of the electric motor are supported by a non-magnetic bracket $d^4$, affording a bearing for the shaft $d^5$ of the electric motor. This shaft is extended through the plate $d^3$, and the extended portion either constitutes or carries the drum $e$ of the rotary pump.

The electric motor may be of the alternating-current or the continuous-current type, as found desirable in different instances, and it will be understood that other apparatus than electric motors may be substituted for driving the pumping apparatus. In practice, however, it is usually preferred to use an electric motor operating at a constant speed.

Figure 1:
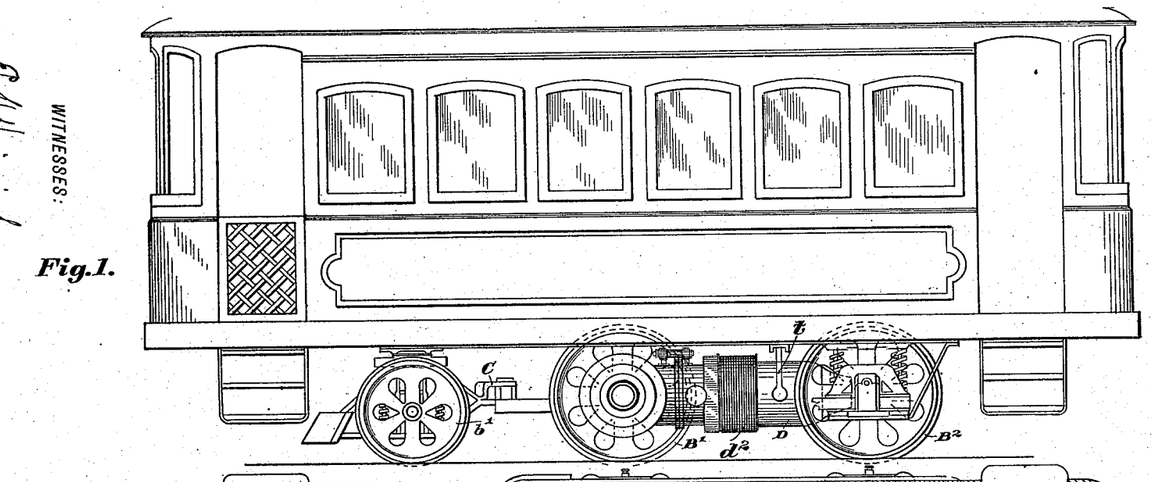
Figure 1 is a side elevation of a car equipped with the combined electric and rotary fluid propelling apparatus.
Figure 2:
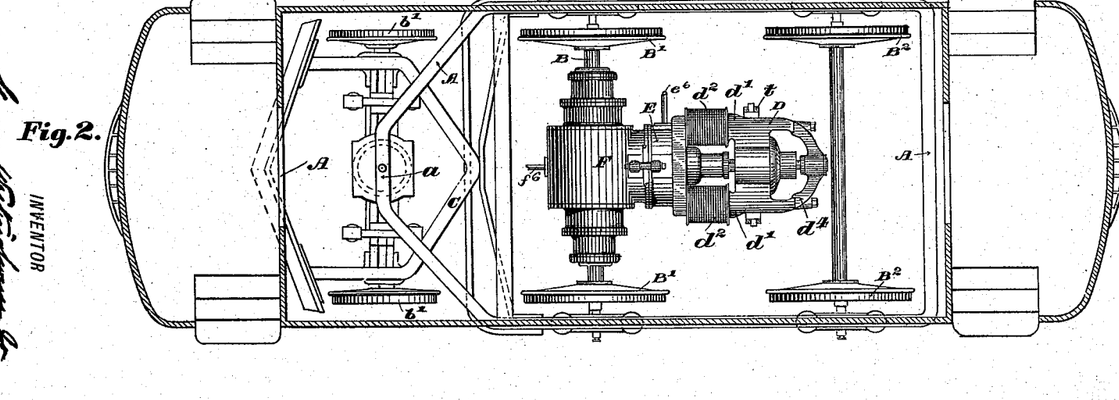
Fig. 2 is a plan of the same, the car-body being removed.
Figure 3:
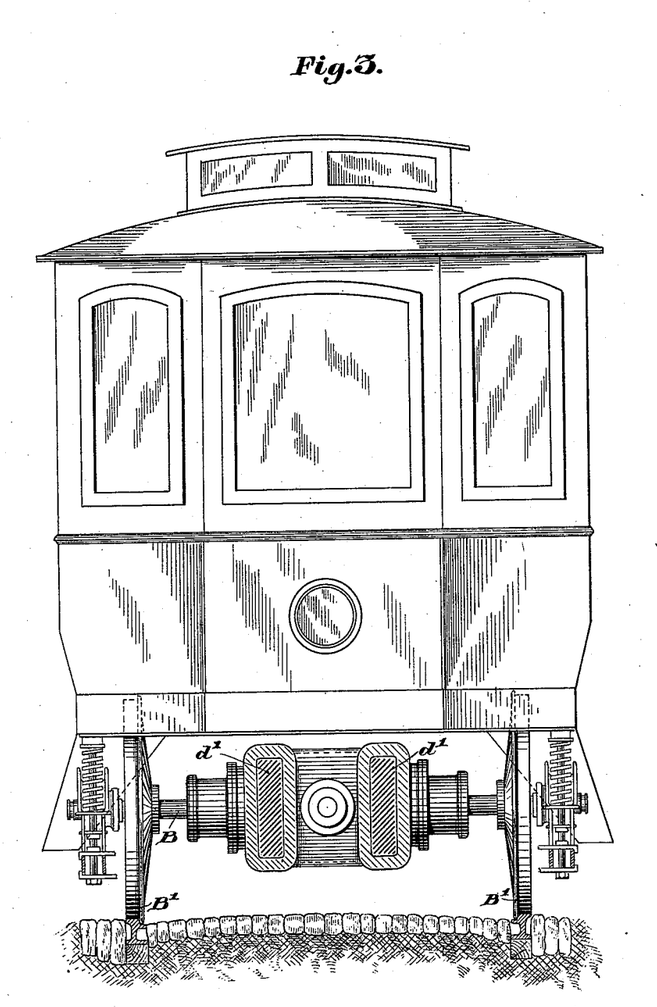
Fig. 3 is an end view, partly in section.
Figure 4:
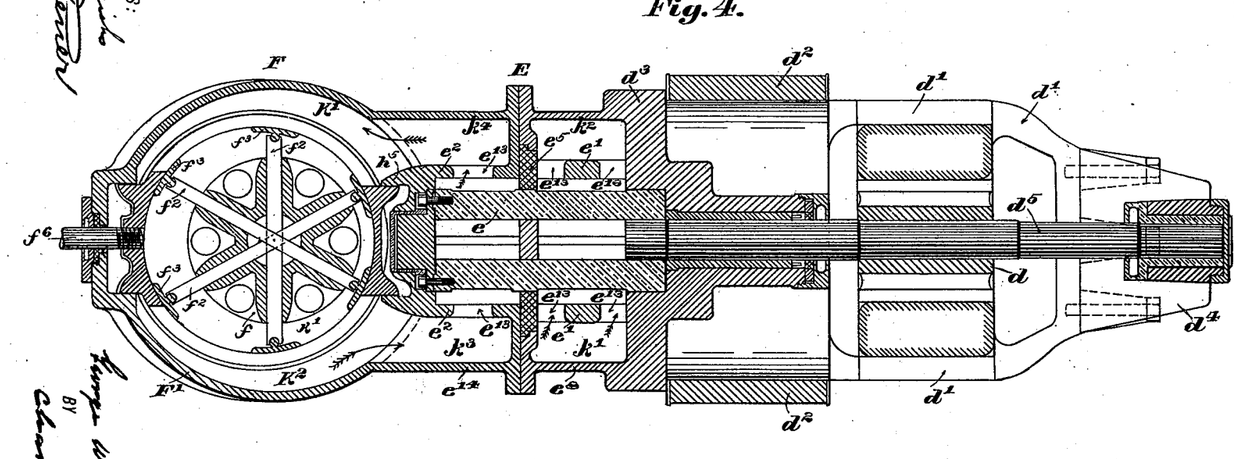
Fig. 4 is a longitudinal vertical section of the apparatus on a larger scale.
Figure 5:
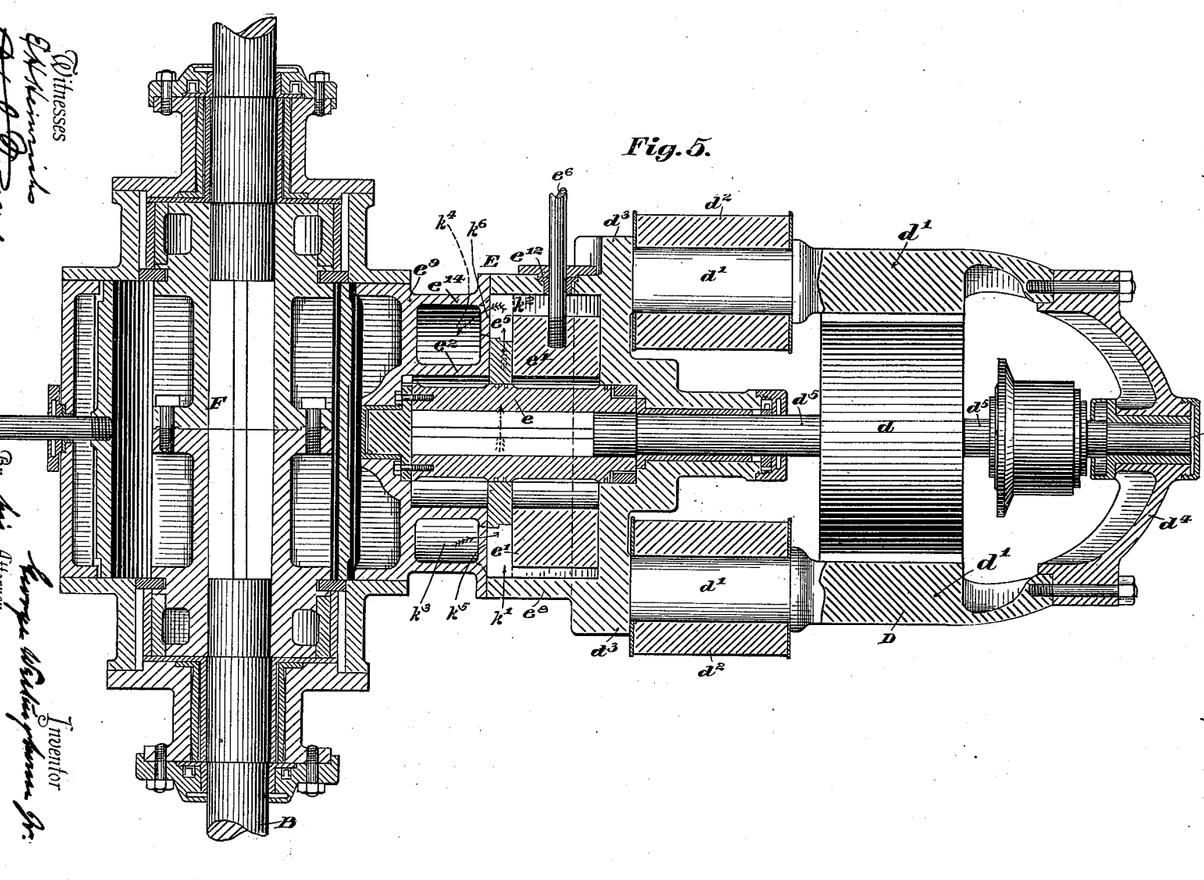
Fig. 5 is a horizontal section.
Figure 6:
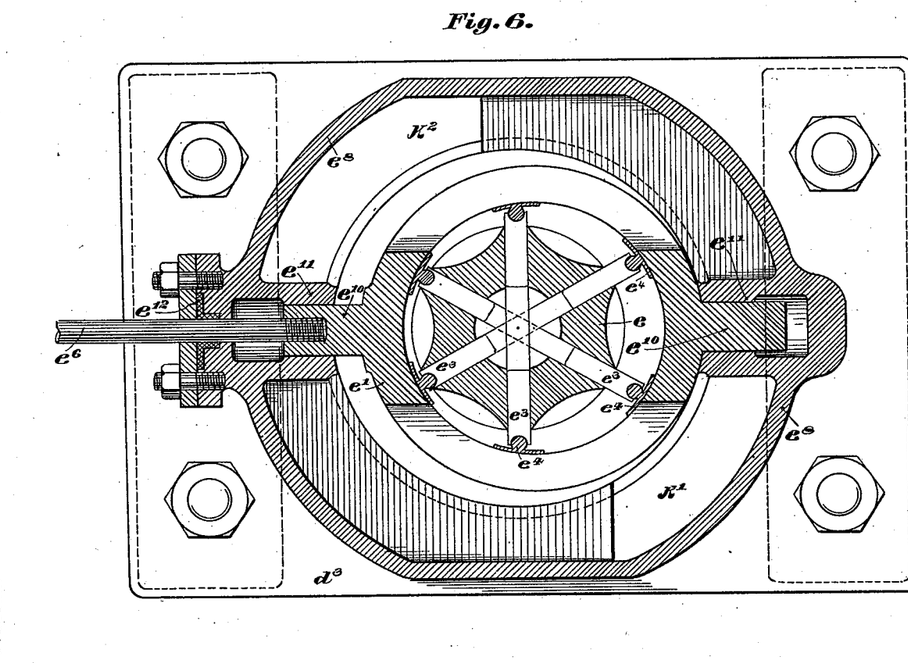
Figs. 6 and 7 are cross-sections of the pump and the motor, respectively.
Figure 7:
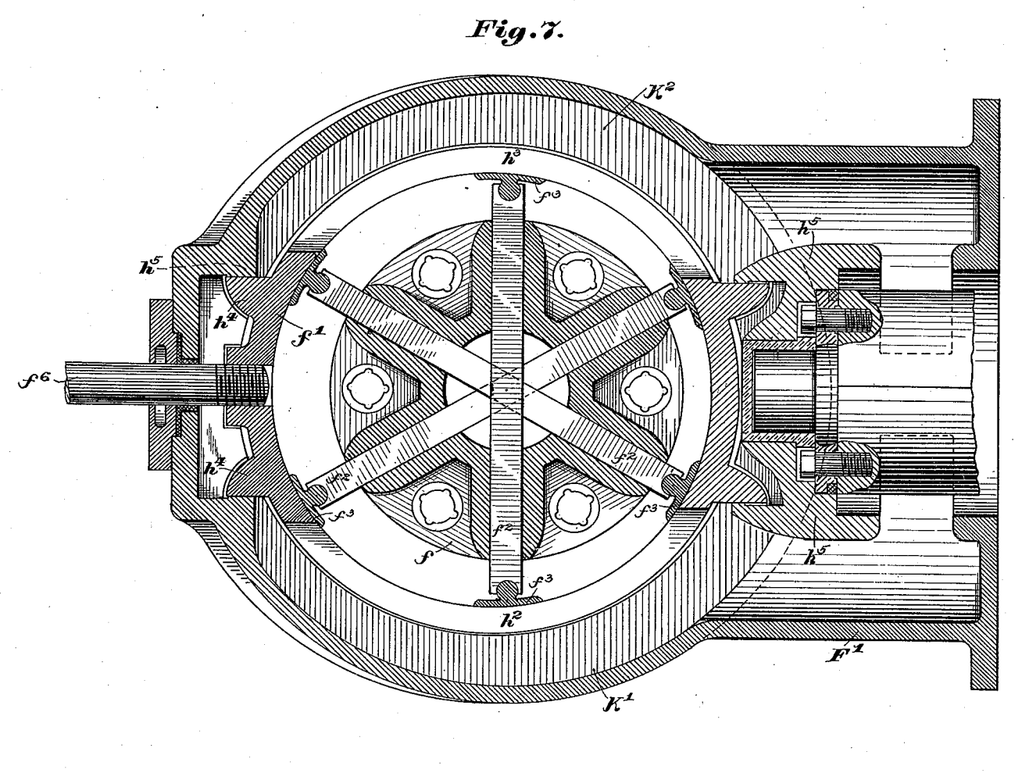
Figure 8:
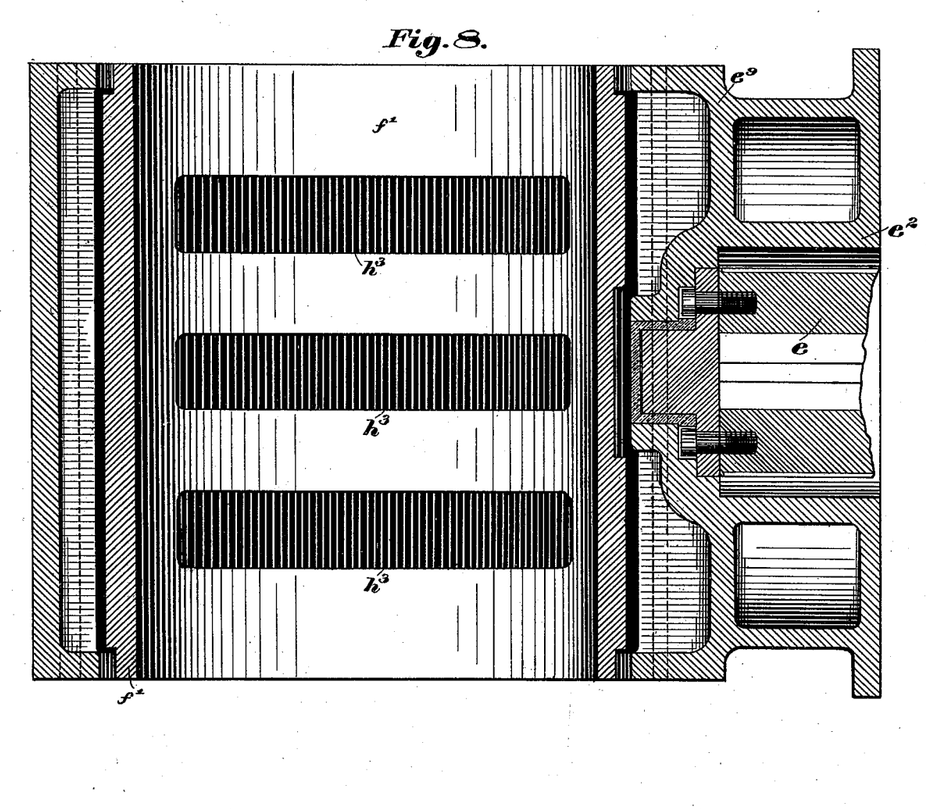
Fig. 8 is a section of the motor-case, showing the inclosing cylinder of the drum.

The general construction of the pumping apparatus will now be described. In the present instance I propose to make the pump in two sections, one or both of which may be adjustable for the purpose of more perfectly regulating the amount of fluid pumped, its pressure, and its direction of flow. The drum $e$ is provided with pistons $e^3$, which are free to move in planes passing diametrically through the drum, one set of pistons being provided for each of the two sections of the pump. Two cylinders $e'$ $e^2$ inclose the respective sets of pistons and a wall or head $e^5$ separates the two sections of the pump. The pistons carry packing-plates $e^4$ at their edges and these packing-plates slide against the inner surfaces of the corresponding inclosing cylinders $e'$ $e^2$. The cylinders are of greater diameter than the drum; but the pistons are of such dimensions as to touch opposite sides of the corresponding cylinders at all times, and thus close the spaces between the drum and the cylinder. The cylinders, when work is being done, are eccentric to the drum, and the pistons will therefore be driven to and fro through the drum. Cylindrical casings $e^8$ and $e^{14}$ surround the respective cylinders $e'$ $e^2$. These casings are of sufficient size to leave open spaces or reservoirs $k'$ $k^2$ and $k^3$ $k^4$ upon opposite sides of the cylinders. The reservoirs $k'$ and $k^2$ are separated from each other by division-walls, as shown at $e^{11}$ in Fig. 6, for instance. In like manner the reservoirs $k^3$ and $k^4$ are separated. The openings or reservoirs $k'$ $k^3$ are in communication with each other through a pipe or duct $k^5$, as indicated by dotted lines in Fig. 5, and likewise a pipe or duct $k^6$ connects the reservoirs $k^2$ and $k^4$. Inlet and outlet ports $e^{13}$, Fig. 4, are formed in the opposite sides of the respective cylinders $e'$ $e^2$, and these communicate with the reservoirs $k'$, $k^2$, $k^3$, and $k^4$. The operation of the pump, therefore, is to receive fluid from the reservoirs $k'$ $k^3$ and deliver it to the reservoirs $k^2$ and $k^4$. The fluid then passes into a receptacle K', thence through the motor F in a manner hereinafter described and to a receptacle $K^2$. Thence it passes back to the reservoirs $k'$ $k^3$. The operation of the pump is to force the fluid through this liquid-circuit, and thereby drive the fluid-motor. The amount of fluid effectively pumped depends upon the eccentricity of the drum and cylinders. When the degree of eccentricity is greatest, the amount of fluid effectively pumped will be the greatest. If the cylinders be concentric with the drum, the pistons will carry forward and deliver a quantity of fluid on one side of the drum exactly equivalent to that pumped out upon the opposite side. If the cylinders are moved to the opposite side of the drum, then the direction of pumping will be reversed. By making one or both of the cylinders $e'$ and $e^2$ adjustable, therefore, the total quantity of fluid pumped may be varied by simply adjusting the position of one of the cylinders with reference to the drum.

In the drawings I have shown the cylinder $e'$ as being adjustable. It is in this instance provided with lugs $e^{10}$, which extend into slots formed in the division-walls $e^{11}$, which project from the casing $e^8$. An adjusting-rod $e^6$ passes through a suitable packing-box $e^{12}$ and serves to move the cylinder in a direction transverse to the axis of the drum $e$. The rod may be moved to and fro, as required, in any convenient manner.

By reversing the adjustable section of the pump it may be caused to act in opposition to the other section, so that the quantity of fluid delivered by the combined action of the two may be reduced to less than that which one section alone is capable of delivering. If the cylinder $e'$ be adjusted so as to pump in one direction the same quantity as is being pumped in the other direction by the other section, no effective pumping will be accomplished. The capacity of the adjustable section is, however, preferably somewhat greater than that of the other section, so that by completely reversing the adjustable section the effective pumping may be reversed, the quantity of fluid delivered being equivalent to the difference between the quantities pumped by the two. The construction of the two pumps or pump-sections is essentially the same, except for this adjustability of one.

In case it should be desired to reverse the direction of pumping and at the same time obtain the combined effects of the two pump-sections, the direction of rotation of the drum may be reversed.

Figure 9:
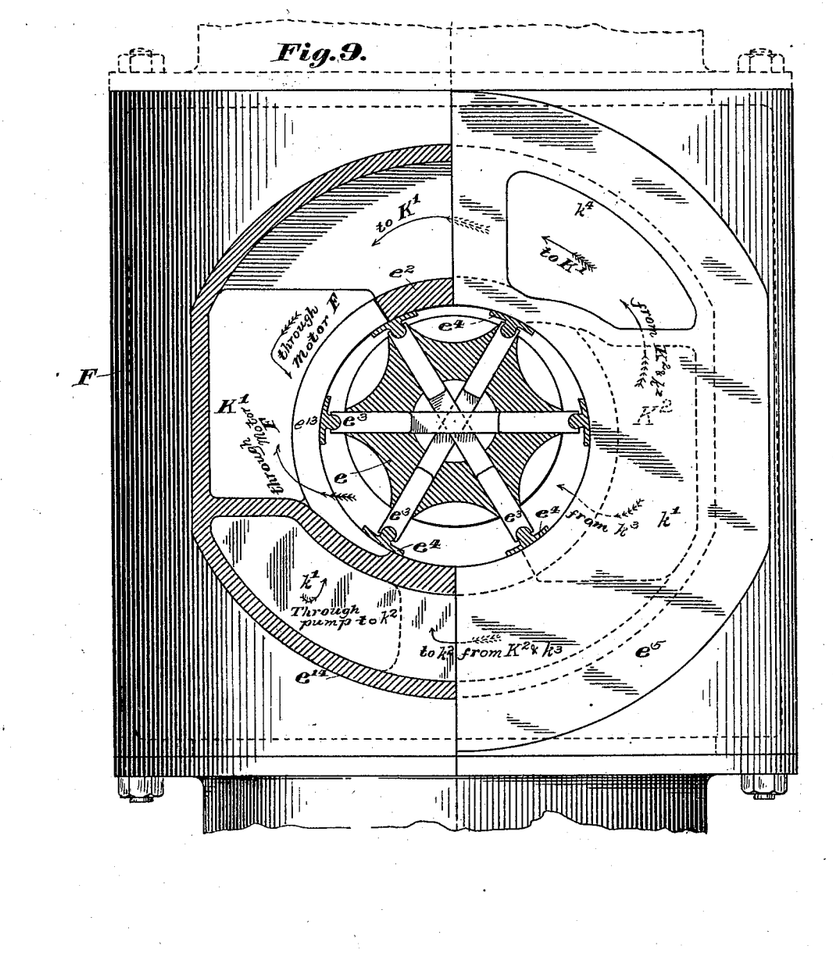
Figs. 9 and 10 are details showing an arrangement of ports and ducts connecting the pump-sections.
Figure 10:
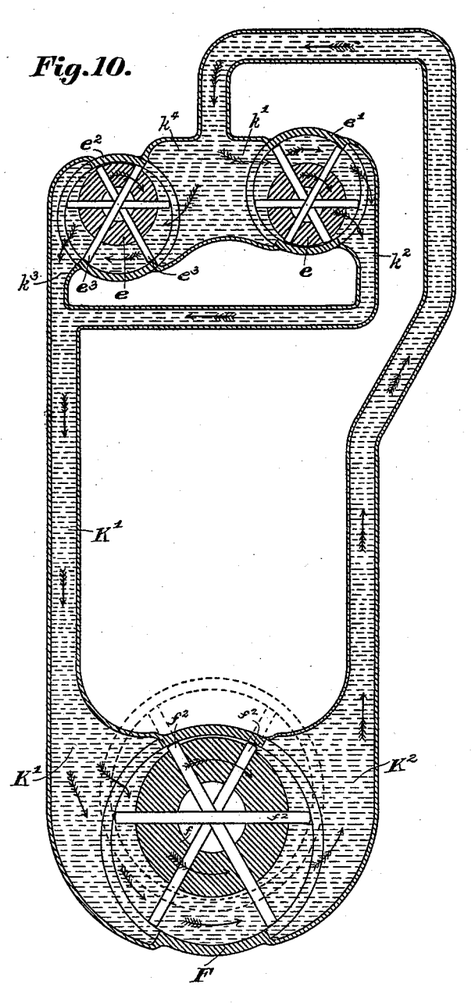

The two cylinders $e'$ $e^2$ may be normally eccentric from the drum in the same direction, so that fluid will be received upon one side of the drum through both cylinders and delivered at the other side; or for the purpose of balancing the pressure upon the drum, and consequently upon the bearings or journals of the shaft, the two cylinders may be made normally eccentric in opposite directions, as indicated, for instance, in Fig. 9 and the theoretical diagram 10, so that while fluid is received upon one side of the drum through the cylinder $e'$ it will be received upon the other side of the drum through the ports of the cylinder $e^2$. To accomplish this, it is only necessary that the reservoirs $k'$ and $k^4$ be connected with each other, and likewise $k^2$ and $k^3$. This may be done by internal ducts $k^5$ and $k^6$, formed through the division-head $e^5$. The plan of circulation of fluid in this instance can best be understood by reference to the diagram Fig. 10. In this diagram the two sections of the pump-drums $e$ are represented as being placed side by side and each surrounded by its cylinder $e'$ and $e^2$, respectively, these cylinders being normally eccentric from the axial line of the drum-sections in opposite directions. They pump from the communicating reservoirs $k'$ $k^4$ and deliver into the communicating ducts or reservoirs $k^2$ and $k^3$. The fluid is thus delivered to the chamber $K'$ and drives the motor F in one direction or the opposite, according to the direction of the eccentricity of its cylinder $f'$. From the pump the fluid then passes to the chamber $h^2$ back to the reservoirs $k'$ $k^4$.

The general construction of the rotary motor apparatus is very similar to that of the pumping apparatus. It consists of a drum $f$, provided with piston-slides $f^2$, which slide to and fro within the drum. The pistons carry packing-plates $f^3$, which rest against and move in contact with the surface of the bore of the inclosing cylinder $f'$. An inclosing case F' surrounds the cylinder $f'$, and between the two are open spaces or chambers forming the reservoirs $K'$ and $K^2$ and separated by walls or lugs $h^5$. The cylinder is provided with ports $h^2$ $h^3$, communicating with the respective reservoirs $K'$ and $K^2$. The position of this inclosing cylinder with reference to the drum is adjusted by means of a rod $f^6$ in much the same manner as the position of the cylinder $e$ in the pumping apparatus is adjusted, being provided with lugs $h^4$, passing within the lugs $h^5$ upon the case F'. The adjustability of this cylinder forms an important feature of the invention, for it affords a considerable variation in the effective piston-surface exposed to the action of the fluid, and therefore permits a great variation in the power and speed on the part of the motor apparatus without necessitating variations in the pressure exerted by the pumping apparatus.

The operation of the apparatus is as follows: The driving-motor D revolves the drum of the pumping apparatus and forces the fluid into the reservoir $K'$. Thence it passes through the ports $h^2$ into the space between the drum and cylinder, forcing the drum to revolve by its pressure against the pistons. The fluid is then delivered at the opposite side of the case through the ports $h^3$ and the conduit $K^2$ back to the pumping apparatus upon the opposite side. Instead, however, of delivering the fluid directly back to the pump it may in some instances pass elsewhere or be otherwise disposed of, as is found desirable in different instances, as in a reservoir.

The drum $f$ is carried by or constitutes a part of the axle B of the wheels B' B', so that the direction and rate of revolution of the latter depend upon the rotation of the drum.

In the drawings there are shown several details of construction which are found convenient in practice, but which may be variously modified in different instances. For example, the inclosing case $e^8$ may be conveniently formed by casting an annular web upon a back plate $d^3$ of the motor, which plate also constitutes the head of the pump. In like manner the head $e^9$ of the other section of the pump may be cast in a single piece with the cylinder $e^2$ and its surrounding case $e^{14}$. The entire apparatus is shown as sleeved at one end upon the axle B. The other end may be supported by a link $t$ or otherwise from the car-body or truck-frame, or it may be supported in any other convenient manner. It will further be understood that the employment of a pony-truck is not essential to the invention and that various of the details of construction may be modified without departing from the spirit of the invention.

I claim as my invention—

1. The combination with a rotary eccentric piston pump and a means for altering the eccentricity of said pump at will, of a hydraulic motor and a closed liquid circuit connecting said pump and said motor, substantially as described.

2. The combination of a rotary pump having rotating pistons rotating within a cylinder, said cylinder being capable of adjustment in a plane at right-angles to the plane of the said pistons, and a hydraulic motor receiving its fluid from said pump and a closed liquid circuit between said pump and motor.

3. The combination with a pump and a rotary eccentric hydraulic motor, a closed liquid circuit connecting said pump and said motor, and a device or devices for altering the eccentricity of said motor, substantially as described.

4. The combination of a rotary pump driven by any source of power and a hydraulic motor connected to the pump by a liquid circuit and a means for altering the eccentricity of both pump and motor, substantially as described.

5. The combination with an electric motor, of a rotary eccentric piston pump composed of two sections, one adjustable as to its eccentricity, and a rotary eccentric piston engine receiving fluid under pressure from said pump.

6. The combination with an electric motor, of a rotary eccentric piston pump driven thereby and constructed in two sections, one section approximately constant in its output and the other adjustable as to its eccentricity for varying and reversing the direction of its pumping and a fluid motor receiving its fluid from said pump, substantially as described.

7. A variable speed gear consisting of means of supplying fluid pressure, a rotary eccentric hydraulic motor supplied therefrom, and a device or devices for varying the eccentricity of said motor, substantially as described.

8. In a variable speed gear, the combination with a means of supplying fluid pressure, of a hydraulic motor having extensory paddles and a device for varying the surface of said paddles exposed to the driving liquid, substantially as described.

9. The combination of two rotary eccentric piston pumps or pumping sections normally working in unison with each other, one section being adjustable as to its eccentricity for varying the direction of flow of the fluid, and a rotary eccentric piston fluid engine or motor to which the fluid is delivered from said pumps, substantially as described.

10. The combination of a rotary eccentric piston pump, an adjusting device varying the quantity of fluid pumped thereby, a rotary eccentric piston engine or motor to which the fluid is delivered, and an adjusting device therefor, varying the amount of liquid required to produce a given degree of rotation on the part of the motor, substantially as described.

11. In a rotary motor device, the combination of a drum, radial piston slides carried thereby, a cylinder surrounding the drum against the inner surface of which said piston-slides bear, a rotary eccentric piston pumping apparatus communicating with said rotary engine, and means for varying the eccentricity of said apparatus to vary the quantity of liquid propelled and to reverse its direction with reference to said motor or engine, substantially as described.

In testimony whereof I have hereunto subscribed my name this 30th day of January, A. D. 1892.

GEO. WESTINGHOUSE, JR.

Witnesses:
   CHARLES A. TERRY,
   JAMES W. SMITH.